Patented Nov. 20, 1951

2,575,686

UNITED STATES PATENT OFFICE 2,575,686

HEAT- AND FLAME-RESISTANT RESINOUS REFRACTORIES

Eli Simon, Los Angeles, and Frank W. Thomas, Burbank, Calif., assignors to Lockheed Aircraft Corporation, Burbank, Calif.

No Drawing. Application February 24, 1948, Serial No. 10,574

15 Claims. (Cl. 260—30.6)

This invention relates to thermal barrier and protective systems and relates more particularly to heat and flame resistant materials for protecting underlying parts and structures against the effects of high temperatures.

The commercially available materials adapted to be applied to electrical junction boxes, fire wall door seals, heat exchanger couplings and primary and secondary structures to protect them against excessive temperatures generated during fires are not altogether satisfactory. Such previously introduced compounds include inorganic adhesive matrixes, aqueous phosphate and borate type brush and spray solutions, silicates and liquid porcelains. The shortcomings of these materials are the lack of adequate and retained adhesion, insufficient flexibility, water solubility, the tendency to absorb inflammable oils, etc., and the lack of aging stability.

It is an object of the present invention to provide a practical, dependable, fire-resistant thermal barrier material that does not have the limitations and shortcomings of materials of this class now on the market. The fire-resistant heat barrier material of the invention retains excellent adhesion and does not crack under vibration, has good low temperature characteristics and is non-corrosive. Furthermore, the material resists oil sorption, remains intact during combustion and is relatively light in weight.

It is another object of the invention to provide a material of the character referred to that is in the form of a plastic matrix, that may be easily applied to fully conform with the contour of the base or underlying structure. This feature of the invention coupled with the freedom from cracking under vibration, the excellent adhesion and heat and fire resistant characteristics well suit the material for aricraft applications. There are numerous situations in aircraft where a heat and flame resistant material is required to protect certain parts against the effects of fires. For example the basic structural parts at or adjacent a fire wall should be protected from the high temperatures that may develop during an engine fire. In such applications it is essential that the refractory or protective material conform with the part to which it is applied and retain its adhesion without cracking even under the influence of temperatures as high as 2000° F. coupled with vibration and abrupt thermal changes resulting from air blasts, etc.

Another object of the invention is to provide a refractory or flame resistant material that is in the nature of a resinous plastic, carrying vitreous fibers and refractories that is characterized by a rapid release of its solvent even when applied in thick sections or coatings. The material may be compounded in the form of a putty-like matrix which hardens by solvent release after application in sections or layers one-quarter inch thick or thicker to provide a tough, hard coating having good adhesion to metal, wood, etc., and preserving considerable resistance to abrasion.

A further object of the invention is to provide a heat and flame resistant material of the class described that is simple to manufacture, that has good package stability, and that does not embody toxic components.

Other advantages and features will become apparent from the following detail description in which several formulations of the invention are given by way of example.

The resinous refractory materials of the invention may be said to comprise essentially a fire-retardant organic resin, non-adsorbent vitreous fiber, powdered or fibrous refractories, a fire-retardant plasticizer, a solvent or carrier, and where desired or required, a stabilizer or gelation inhibitor.

The resinous component of the heat and flame resistant materials is preferably a vinyl chloride-vinyl acetate copolymer resin containing from between 80% and 95% polyvinyl chloride. This organic resin has good adhesion characteristics and where used as a binder for the maxtrix, assures a fire resistant, elastomeric material having good adhesion to aluminum, stainless steel, etc. The proportion of the vinyl chloride-vinyl acetate co-polymer employed in the formulations of the invention may vary considerably. The weight percentage of the co-polymer employed, based on one hundred parts by weight of the finished product, is between 5% and 20%. Where the expression "parts by weight of the finished product" is used herein, it is to be understood that the carrier or solvent is considered to be a part of the final or "finished" product.

The vitreous fibers serve as an extender or filler and give the product effective thermal insulation properties with a minimum density. The fibers employed are preferably sodium-potassium-borosilicate glass fibers known to the trade as Pyrex glass fibers, or leached glass fibers wherein the basic constituents such as $Na_2O$, etc., have been removed by leaching leaving essentially pure silica. The softening point of the sodium-potassium-borosilicate glass fibers is from 1400° F. to 2000° F., while the softening point of the leached silica glass fibers is from 2000° F. to 3200° F. The length of the vitreous fibers is between $\frac{1}{64}$ and $\frac{3}{8}$ inch and the weight percentages of the fibers employed is from 11.36 to 15%, based on one hundred parts by weight of the finished product.

The refractories incorporated in the material are selected from the silicates, powdered metal oxides and metal carbonates. We have found that magnesium silicate, aluminum silicate and potassium aluminum silicate are satisfactory, although other silicates of this general class are also comprehended by the invention. The fusion points of the silicates is from 2000° F. to 3500° F., the magnesium silicate ($2MgO \cdot SiO_2$) having a fusion point of 3434° F., the aluminum silicate ($3Al_2O_3 \cdot 2SiO_2$) having a fusion point of 3290° F., and the potassium aluminum silicate ($K_2O \cdot Al_2O_3 \cdot 2SiO_2$) having a fusion point of 3254° F. The powdered metal oxides that have proven to be effective in the heat and flame resistant material of the invention have fusion points from 3500° to 5500° F. Typical of these are the following:

Magnesium oxide (MgO), fusion pt., 5072° F.
Thorium oxide ($ThO_2$), fusion pt., 5486° F.
Cerium oxide ($CeO_2$), fusion pt., 5090° F.
Zirconium oxide ($ZrO_2$), fusion pt., 4928° F.

The metal carbonates which we have found to be satisfactory for inclusion in the product have fusion points from 3500° to 5500° F. Typical of these are magnesite, which occurs in nature as magnesium carbonate, $MgCO_3$, having a fusion point of approximately 5000° F. after the carbon dioxide has been driven off; calcium carbonate, $CaCO_3$, having a fusion point of 4658° F.; and dolomite, $Ca\ Mg(CO_3)_2$, having a fusion point of approximately 4750° F. The refractories may be employed individually in the proper or required amount or in combinations or mixtures where compatible. We have found that the maximum temperature and flame resisting temperature of the finished and applied product is primarily a function of the type and concentration of the vitreous fibers and refractory materials used in the formulation. The concentration range of the refractory material or materials is from 14.26 to 25% by weight based on one hundred parts of the finished product, the concentration range of the vitreous fibers being from 11.36 to 15% by weight as previously described.

We prefer to plasticize the vinyl resin by means of a plasticizer which increases the flame resistance of the product and which imparts increased flexibility to the product. The plasticizer is chosen from the phosphate esters and the examples of this class that have been found to be effective are: tricresyl phosphate, tributyl phosphate, chlorethyl phosphate, cresyl phenyl phosphate. The proportion or concentration of the plasticizer employed will, of course, depend to some extent upon the intended or desired flexibility of the applied product. In practice the weight percentage range of the selected plasticizer is from 1% to 10%, based on one hundred parts by weight of the finished product.

Where the compounded product is to be stored or packaged for any appreciable time, prior to use, it is desirable to incorporate a stabilizer for extending the packaged life. We have found that from 0.1% to 1.0% by weight of amino ethylethanolamine based on one hundred parts of the finished product is effective as a stabilizer or gelation inhibitor. It is to be understood that the stabilizer is not essential where the product is prepared for use in the immediate or near future.

The preferred carrier or solvent for the product is ethyl acetate. The proportion of the solvent employed, of course, depends to a large degree upon the desired consistency of the material and upon the manner in which it is to be applied. We have found that ethyl acetate is readily released by evaporation from the applied material even in situations where the heat and flame resistant product is applied in heavy layers or sections.

The following are typical preferred examples of the heat and flame resistant materials or formulations of the invention. Example A has a recommended maximum flame exposure temperature of 2000° F., while Example B has a recommended maximum flame exposure temperature of 3000° F.

*Example A*

| | Percent by weight |
|---|---|
| Magnesium carbonate—asbestos mixture (85% magnesium carbonate and 15% asbestos ($3MgO \cdot 2SiO_2 \cdot 2H_2O$) | 11.4 |
| Fibrous asbestos (hydrous magnesium silicate—$3MgO \cdot 2SiO_2 \cdot 2H_2O$) | 2.86 |
| 1/32 inch milled Pyrex glass fibers | 11.40 |
| Vinyl chloride—vinyl acetate co-polymer (86% polyvinyl chloride) | 11.40 |
| Tricresyl phosphate | 5.70 |
| Amino ethylethanolamine | 0.14 |
| Ethyl acetate | 57.10 |

*Example B*

| | Per cent by weight |
|---|---|
| Powdered magnesium oxide | 17.00 |
| Milled leached glass fibers $SiO_2$ | 11.36 |
| Vinyl chloride—vinyl acetate co-polymer (86% polyvinyl chloride) | 11.36 |
| Tricresyl phosphate | 3.26 |
| Amino ethylethanolamine | 0.14 |
| Ethyl acetate | 56.88 |

In employing the heat and flame resistant material of the invention it may be applied directly to the parts to be protected by brushing, troweling, etc. Where necessary all paint, primer, grease, etc., is cleaned from the surface of the structure or part to be protected. As noted above the material readily cures by the release or evaporation of the solvent and therefore may be applied in thick layers or sections. By varying the proportion of the carrier employed the consistency of the material may be varied to adapt the material for ready application in any preferred manner. The flame and heat resisting material effectively adheres to various metals, wood, etc. If desired or necessary the applied material may be kept moist or plastic by a thinner such as ethyl acetate or a diluent such as isopropyl alcohol during the troweling or applying operation.

To obtain maximum thermal and flame protection where the expected temperatures will not exceed 2000° F., one or more layers of silica glass fibers are laminated between layers or coatings of from one-eighth to one-quarter inch of the resinous heat and flame resistant material. Where temperatures in the order of 3000° F. are to be encountered, layers of silica glass cloth are preferably laminated between relatively thin coatings of the resinous material. The laminating layer or layers of the silica glass cloth prevent the cured resinous refractory material from cracking when the protected structure warps or vibrates during a fire. In building up the laminated barrier a relatively thin coating of the resinous material is first applied directly to the part to be protected. A layer or lamination of the silica glass fabric is applied over this initial coating as it is troweled on. This procedure may be repeated to build up successive layers of the resinous refractory material and the glass layers until the desired thickness is obtained. Where a large area is to be covered and the laminations are to be put on in segments of a given size, it is desirable to overlap the laminations of the silica glass fabric.

Where the particular installation is such that the flame and thermal barrier is likely to be contacted by oils or other combustible fluids, the absorption resistance of the resinous material may be increased by a topcoating or applied lacquer composed of vinyl chloride-vinyl acetate copolymer (80%–95% polyvinyl chloride), 16.66 parts by weight, ethyl acetate 83.1 parts by weight, and amino ethylethanolamine 0.24 part by weight.

The resinous refractory materials of the invention have been found to withstand directly applied flame temperatures in the order of from 2000° F. to 3000° F. for periods of fifteen minutes or longer without cracking, breaking free or disintegrating, and while maintaining the structure which they are shielding at below 400° F. The thermal barrier characteristics of the material are excellent and may be improved by the incorporation of laminations of silica or leached glass fabric as above described. The adherence of the material is not destroyed by the flame or high temperatures and the barrier material does not glow, burn, or otherwise maintain a fire after the flame is removed. The material is relatively light in weight and is inexpensive to manufacture.

Having described only typical preferred examples of the invention, we do not wish to be limited to the specific details herein set forth but wish to reserve to ourselves any features or modifications that may fall within the scope of the following claims.

We claim:

1. A heat and flame resistant material adapted for application by brushing or troweling comprising on an approximate weight percentage basis from 5 to 20% vinyl chloride-vinyl acetate co-polymer resin, from 1 to 10% phosphate ester serving as a plasticizer for the resin, from 11.36 to 15% glass fibers from 1/64 to 3/8 inch in length, from 14.26 to 25% of a powdered refractory material, and a sufficient quantity of a volatile carrier to give the mixture a putty-like consistency.

2. A heat and flame resistant material adapted for application by brushing or troweling comprising on an approximate weight percentage basis from 5 to 20% vinyl chloride-vinyl acetate co-polymer resin containing from between 80% and 95% polyvinyl chloride, from 1 to 10% aryl phosphate ester serving as a plasticizer for the resin, 11.36 to 15% glass fibers from 1/64 to 3/8 inch in length, from 14.26 to 25% of a powdered refractory material, and a sufficient quantity of a volatile solvent for said resin to give the mixture a putty-like consistency.

3. A heat and flame resistant material adapted for application by brushing or troweling comprising on an approximate weight percentage basis from 5 to 20% vinyl chloride-vinyl acetate co-polymer resin, from 1 to 10% aryl phosphate ester serving as a plasticizer for the resin, from 11.36 to 15% glass fibers from 1/64 to 3/8 inch in length and having a fusion point of from 1400° F. to 2000° F., from 14.26 to 25% of a powdered refractory material, and a sufficient quantity of a solvent for said resin to give the mixture a putty-like consistency.

4. A heat and flame resistant material adapted for ready application by brushing or troweling comprising on an approximate weight percentage basis from 5 to 20% vinyl chloride-vinyl acetate co-polymer resin, from 1 to 10% tricresyl phosphate serving as a plasticizer for the resin containing from between 80% and 95% polyvinyl chloride, from 11.36 to 15% leached glass fibers from 1/64 to 3/8 inch in length having a fusion point of from 2000° F. to 3200° F., from 14.26 to 25% of a powdered refractory material having a fusion point of from 3500° F. to 5500° F., and a sufficient quantity of a solvent for said resin to give the mixture a putty-like consistency.

5. A heat and flame resistant resinous material adapted for ready application by brushing or troweling comprising on an approximate weight percentage basis from 5 to 20% vinyl chloride-vinyl acetate co-polymer resin containing from between 80% and 95% polyvinyl chloride, from 1 to 10% alkyl phosphate ester serving as a plasticizer for the resin, from 11.36 to 15% glass fibers from 1/64 to 3/8 inch in length and having a fusion point of from 2000° F. to 3200° F., from 14.26 to 25% powdered metal oxide having a fusion point of from 3500° F. to 5500° F., and a sufficient quantity of solvent to give the mixture a putty-like consistency.

6. A heat and flame resistant resinous material adapted for ready application by brushing and troweling comprising on an approximate weight percentage basis from 5 to 20% vinyl chloride-vinyl acetate co-polymer resin containing from between 80% and 95% polyvinyl chloride, from 1 to 10% alkyl phosphate ester serving as a plasticizer for the resin, from 11.36 to 15% glass fibers from 1/64 to 3/8 inch in length and having a fusion point of from 1400° F. to 2000° F., from 14.26 to 25% powdered magnesium oxide, and a sufficient quantity of ethyl acetate to give the mixture a consistency for ready application by troweling or brushing.

7. A heat and flame resistant resinous material adapted for ready application by brushing and troweling comprising on an approximate weight percentage basis from 5 to 20% vinyl chloride-vinyl acetate co-polymer resin containing from between 80% and 95% polyvinyl chloride, from 1 to 10% aryl phosphate ester serving as a plasticizer for the resin, 11.36 to 15% glass fibers of from 1/64 to 3/8 inch in length and having a fusion point of from 2000° F. to 3200° F., 14.26 to 25% magnesium carbonate, and a sufficient quantity of ethyl acetate to form a carrier and to give the mixture the desired consistency for application.

8. A heat and flame resistant resinous material adapted for ready application by brushing and troweling comprising on an approximate weight percentage basis from 5 to 20% vinyl chloride-vinyl acetate co-polymer resin containing from between 80% and 95% polyvinyl chloride, from 1 to 10% alkyl phosphate ester serving as a plasticizer for the resin, from 11.36 to 15% sodium-potassium-borosilicate glass fibers from 1/64 to 3/8 inch in length, from 14.26 to 25% magnesium silicate, and a sufficient quantity of ethyl acetate to constitute a carrier and to give the mixture the desired consistency for application.

9. A heat and flame resistant resinous material comprising on an approximate weight basis from 5 to 20% vinyl chloride-vinyl acetate co-polymer resin containing from between 80% and 95% polyvinyl chloride, from 1 to 10% tricresyl phosphate serving as a plasticizer for the resin, from 11.36 to 15% glass fibers from 1/64 to 3/8 inch in length and having a fusion point of from 2000° F. to 3200° F., from 14.26 to 25% powdered magnesium oxide, from 0.1 to 1.0% amino ethylethanolamine, and a sufficient quantity of ethyl acetate to constitute a carrier for the mixture and to give the mixture the required consistency.

10. A heat and flame resistant resinous material comprising:

| | Per cent by weight |
|---|---|
| Magnesium carbonate — asbestos mixture, 85% magnesium carbonate — 15% hydrous magnesium silicate | 11.4 |
| Fibrous asbestos, hydrous magnesium silicate | 2.86 |
| Milled Pyrex glass fibers of from 1/64 to 3/8 inch in length | 11.40 |
| Vinyl chloride-vinyl acetate co-polymer 86% polyvinyl chloride | 11.40 |
| Tricresyl phosphate | 5.70 |
| Ethyl acetate | 57.24 |

11. A heat and flame resistant resinous material comprising:

| | Per cent by weight |
|---|---|
| Powdered magnesium oxide | 17 |
| Leached milled glass fibers $SiO_2$ from 1/64 to 3/8 inch in length | 11.36 |
| Vinyl chloride-vinyl acetate co-polymer, 86% polyvinyl chloride | 11.36 |
| Tricresyl phosphate | 3.26 |
| Ethyl acetate | 57.02 |

12. A heat and flame resistant resinous material comprising:

| | Per cent by weight |
|---|---|
| Powdered magnesium oxide | 17 |
| Leached milled glass fibers $SiO_2$ of from 1/64 to 3/8 inch in length | 11.36 |
| Vinyl chloride-vinyl acetate co-polymer, 86% polyvinyl chloride | 11.36 |
| Tricresyl phosphate | 3.26 |
| Ethyl acetate | 56.88 |
| Amino ethylethanolamine | 0.14 |

13. A heat and flame resistant resinous material comprising:

| | Per cent by weight |
|---|---|
| Magnesium carbonate — asbestos mixture, 85% magnesium carbonate — 15% hydrous magnesium silicate | 11.4 |
| Fibrous asbestos, hydrous magnesium silicate | 2.86 |
| Milled Pyrex glass fibers of from 1/64 to 3/8 inch in length | 11.40 |
| Vinyl chloride-vinyl acetate co-polymer, 86% polyvinyl chloride | 11.40 |
| Tricresyl phosphate | 5.70 |
| Ethyl acetate | 57.10 |
| Amino ethylethanolamine | 0.14 |

14. An adherent heat and flame resistant material adapted for ready application by brushing and troweling comprising on an approximate weight basis:

| | Per cent |
|---|---|
| Powdered refractory material having a fusion point of from 2000° F. to 5500° F. | from 14.26 to 25 |
| Glass fibers of from 1/64 to 3/8 inch in length | from 11.36 to 15 |
| Vinyl chloride—vinyl acetate co-polymer | from 5 to 20 |
| Aryl phosphate ester | from 1 to 10 | and a sufficient quantity of a volatile solvent for said co-polymer to give the material a putty-like consistency.

15. An adherent heat and flame resistant material adapted for ready application by brushing and troweling comprising on an approximate weight basis:

| | Per cent |
|---|---|
| Powdered magnesium oxide | from 14.26 to 25 |
| Leached milled glass fibers of from 1/64 to 3/8 inch in length | from 11.36 to 15 |
| Vinyl chloride—vinyl acetate co-polymer | from 5 to 20 |
| Aryl phosphate ester | from 1 to 10 | and a sufficient quantity of a volatile solvent for said co-polymer to give the mixture a putty-like consistency.

ELI SIMON.
FRANK W. THOMAS.

REFERENCES CITED

The following references are of record in the file of this patent:

UNITED STATES PATENTS

| Number | Name | Date |
|---|---|---|
| Re. 22,812 | Jenkins | Dec. 3, 1946 |
| 2,183,811 | Homan | Dec. 19, 1939 |
| 2,389,460 | Rinehart | Nov. 20, 1945 |

OTHER REFERENCES

Page 4, Vinylite Resins, Their Forms, Properties and Uses 1942, Carbide and Carbon Chemicals Corp., New York, N. Y.